United States Patent
Levy et al.

(10) Patent No.: US 7,366,423 B2
(45) Date of Patent: Apr. 29, 2008

(54) SYSTEM HAVING MULTIPLE AGENTS ON OPTICAL AND ELECTRICAL BUS

(75) Inventors: Paul S. Levy, Chandler, AZ (US); Karl H. Mauritz, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 623 days.

(21) Appl. No.: 10/334,839

(22) Filed: Dec. 31, 2002

(65) Prior Publication Data
US 2004/0126115 A1 Jul. 1, 2004

(51) Int. Cl.
*H04B 10/00* (2006.01)
(52) U.S. Cl. ............... 398/164; 398/169; 398/170
(58) Field of Classification Search ......... 398/151, 398/162–167, 169, 170
See application file for complete search history.

(56) References Cited

U.S. PATENT DOCUMENTS

| | | | |
|---|---|---|---|
| 5,187,605 A * | 2/1993 | Shikata et al. ............... 398/99 |
| 5,444,804 A * | 8/1995 | Yui et al. ..................... 385/49 |
| 5,796,957 A * | 8/1998 | Yamamoto et al. ......... 709/251 |
| 6,124,926 A * | 9/2000 | Ogawa et al. ........... 356/237.4 |
| 6,652,151 B2 * | 11/2003 | Sato ............................ 385/53 |
| 6,853,768 B2 * | 2/2005 | Kibler et al. ................. 385/33 |
| 2003/0043426 A1* | 3/2003 | Baker et al. ................ 359/109 |
| 2004/0024959 A1* | 2/2004 | Taylor ........................ 711/105 |
| 2004/0044833 A1* | 3/2004 | Ryan .............................. 711/5 |

FOREIGN PATENT DOCUMENTS

EP 000849685 A2 * 6/1998

* cited by examiner

*Primary Examiner*—Dzung Tran
(74) *Attorney, Agent, or Firm*—Kevin A. Reif (57) ABSTRACT

A system includes multiple agents coupled to an optical bus for transmission of high speed signals and to an electrical bus for transmission of low speed signals. The agents can be memory modules, such as DIMMs. An optical connector housing for coupling the agent to the optical bus can include a reflective device such a mirror, a semi reflective mirror, a pellicle beamsplitter, or the like. The low speed signals can be, for example, power, ground, and supervisory signals. The high speed signals can be, for example, data, address, control, and clock signals.

9 Claims, 10 Drawing Sheets

Fig. 11

SYSTEM HAVING MULTIPLE AGENTS ON OPTICAL AND ELECTRICAL BUS

FIELD

This invention relates generally to optical interconnect systems, and more specifically to a system in which multiple memory modules have electrical power and low-speed data transmitted via e.g. copper wire, and high-speed data transmitted via an optical bus in which the connectors have mirrors or pellicles and the memory modules communicate on the optical bus.

DESCRIPTION OF RELATED ART

Optical data transmission systems have, to date, been point-to-point. Multiple optical agents can be connected in series using repeaters or transceivers between each successive pair of adjacent point-to-point optical links.

Electrical busses have limitations on the number of agents, which can be connected to them, before the busses collapse due to diminished signal integrity. Presently, a memory bus is generally capable of supporting only a limited number of memory modules due to deterioration in signal integrity. For example, a computer may be limited to four dual inline memory modules (DIMMs) if the signals are not re-transmitted. Very large memory systems use electrical repeater hubs that fan out the electrical signaling. Increasing the size of the memory system generally requires the addition of more repeater hubs.

Figure 1:
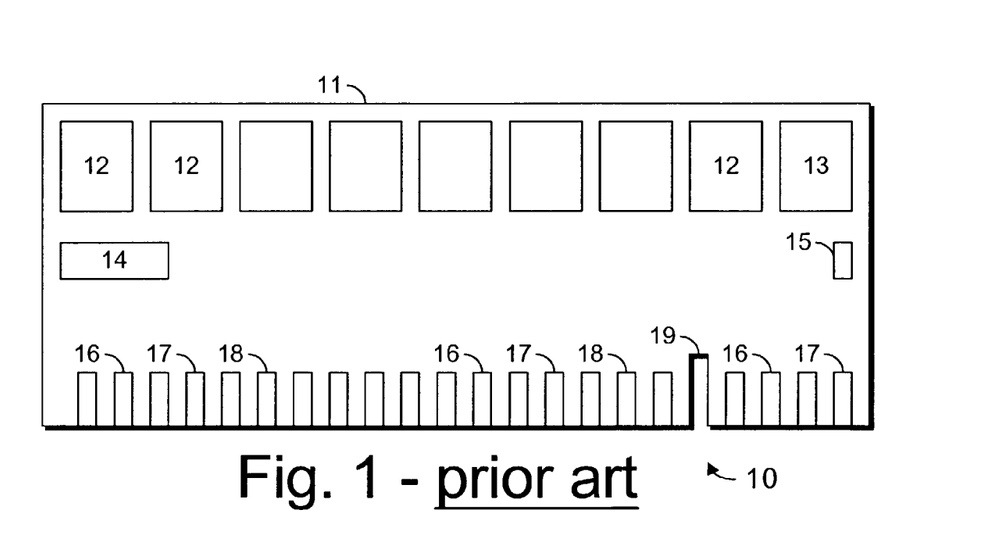
FIG. 1 shows a DIMM according to the prior art.

FIG. 1 illustrates a conventional DIMM 10 which includes a substrate 11, such as a circuit board, upon which are several memory chips 12 (on one or both sides of the substrate), one or more support chips 13, and one or more passive components 14, 15 such as resistors, capacitors, and the like. The connector edge of the substrate includes a number of electrical contacts 16, 17, 18 typically formed as copper plating connected to traces (not shown) that lead to the various chips and components. The contacts include a first set of contacts 16 for carrying high-speed data such as the actual data bits being written to or read from the memory chips, address bits, clocking and timing bits, and so forth. The contacts also include a second set of contacts 17 for carrying low-speed data such as control or configuration information, such as that which may be stored in an E-Prom or non-volatile memory. For example, an E-Prom may contain the DIMM configuration data, memory type and speed and memory size. The contacts also include a third set of contacts 18 for providing ground and power voltages to the DIMM. The substrate may include a cutout or keyway 19 which helps ensure that the DIMM is installed in a correct orientation.

Figure 2:
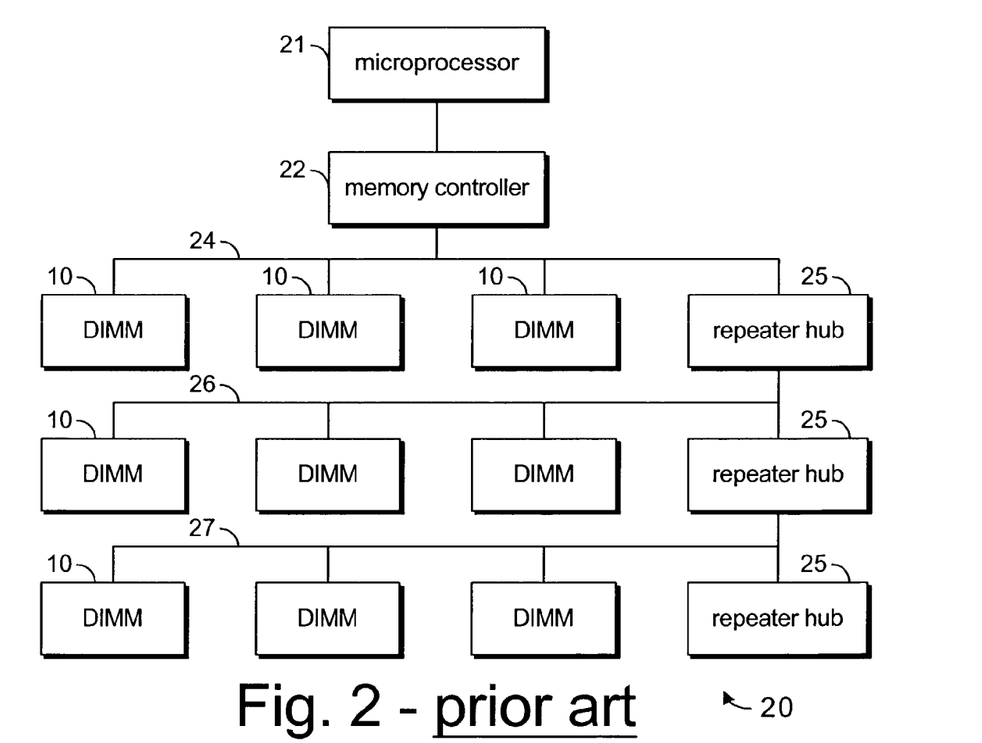
FIG. 2 shows a large memory system according to the prior art.

FIG. 2 illustrates a conventional large memory system 20, including a microprocessor 21, a memory controller 22, and a number of DIMMs 10. A first set of the DIMMs is connected to a first memory bus 24. A repeater hub 25 is connected to the first memory bus and provides fanout to a second memory bus 26, to which is connected a second set of DIMMs and another repeater hub, and so forth. Each respective memory bus is limited in the number of DIMMs that are connected to it, such that electrical signal integrity does not collapse. The repeater hubs provide fanout to additional memory busses, to increase the total number of DIMMs beyond that which a single memory bus could support.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 3:
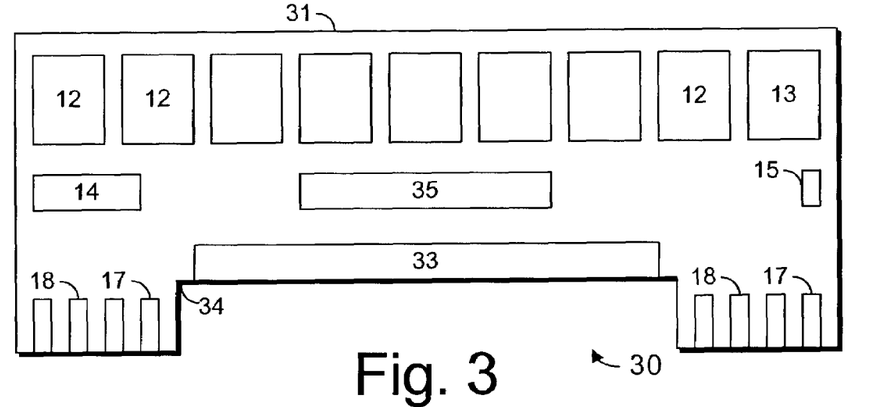
FIG. 3 shows one embodiment of a DIMM having both optical and electrical signals.

FIG. 3 illustrates one embodiment of a dual inline memory module (DIMM) 30 having both optical and electrical signals. The DIMM includes a substrate 31, one or more memory devices 12, and optionally one or more support devices 13 and passive components 14, 15. The substrate includes electrical contacts 17, 18 for providing some of the connections of the DIMM and for carrying low-speed data such as control or configuration information to an E-Prom or non-volatile memory. In one embodiment, these contacts provide power, ground, and low-speed signaling such as system management or supervisory signals. In another, they provide only power and ground and may carry low-speed data such as control or configuration information in an E-Prom or non-volatile memory. An optical interface 33 provides a connection for receiving high-speed signals such as data bits, address bits, and so forth. In some embodiments, the substrate includes a cutout 34, which provides an optical path through which an optical bus (not shown) can pass. An optical-to-electrical signal converter 35 is coupled to receive optical signals from the optical interface and convert them into electrical signals suitable for usage by the memory chips and other electrical components on the substrate. In the interests of simplicity of illustration, the various electrical and optical connections, traces, fibers, and so forth that interconnect the constituent pieces of the DIMM are not shown, as they are well within the ordinary skill of those in relevant fields.

Figure 4:
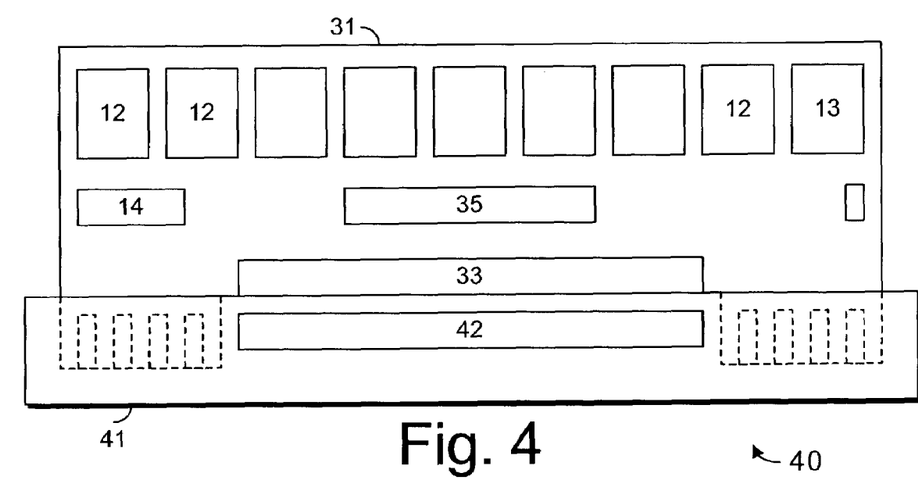
FIG. 4 shows the DIMM of FIG. 3 installed in a connector.

FIG. 4 illustrates one embodiment of the DIMM of FIG. 3 inserted into an optical connector 40. The optical connector includes a connector housing 41 which is suitable for attaching the DIMM to a motherboard (not shown). The housing includes an optical fiber ribbon docking port 42 for accepting the optical fiber (not shown) over which the high-speed signals are transmitted. The housing further includes conventional electrical contacts (not shown) for mating with the low-speed signal contacts of the DIMM, shown in dashed lines as hidden from view within the housing.

Figure 5:
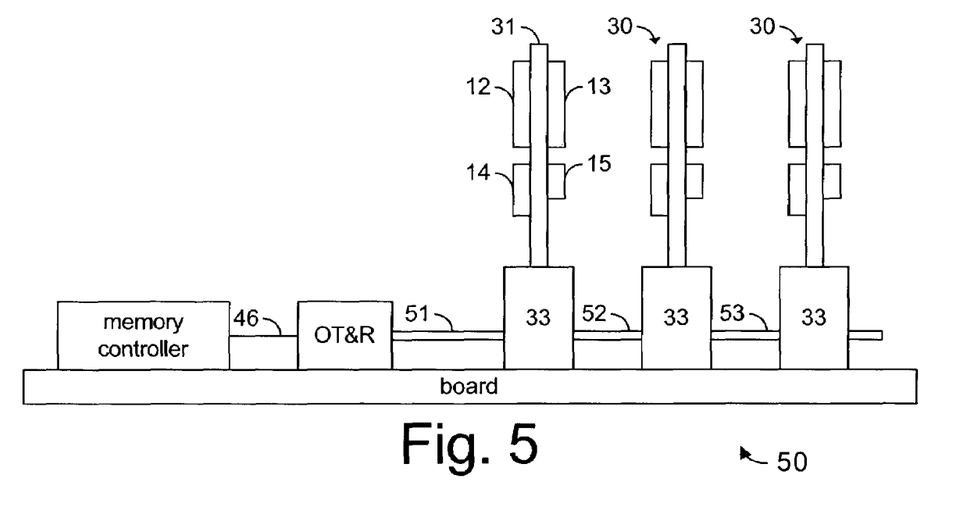
FIG. 5 shows one embodiment of a large memory system having both optical and electrical signals.

FIG. 5 illustrates one embodiment of a system 50 such as a large memory system. The system includes a memory controller coupled by an electrical link 46 to an optical transmitter and receiver ("OT&R"). The OT&R is coupled to an optical connection system 51, 52, 53 which may be a series of point-to-point links or an optical bus. At various locations along the length of the optical connection system is a plurality of optical connector housings 33. The memory controller, OT&R, and optical connector housings may be coupled to a board or substrate, for example a computer motherboard. Some or all of the optical connector housings may be populated with DIMMs 30, each of which may include a substrate (or circuit board) 31, memory devices 12, support devices 13, passive components 14, 15, and an optical interface 33 for optically coupling the DIMM to the housing and the optical connection system.

The OT&R may be considered an agent on the optical bus, as may each of the DIMMs.

Figure 6A:
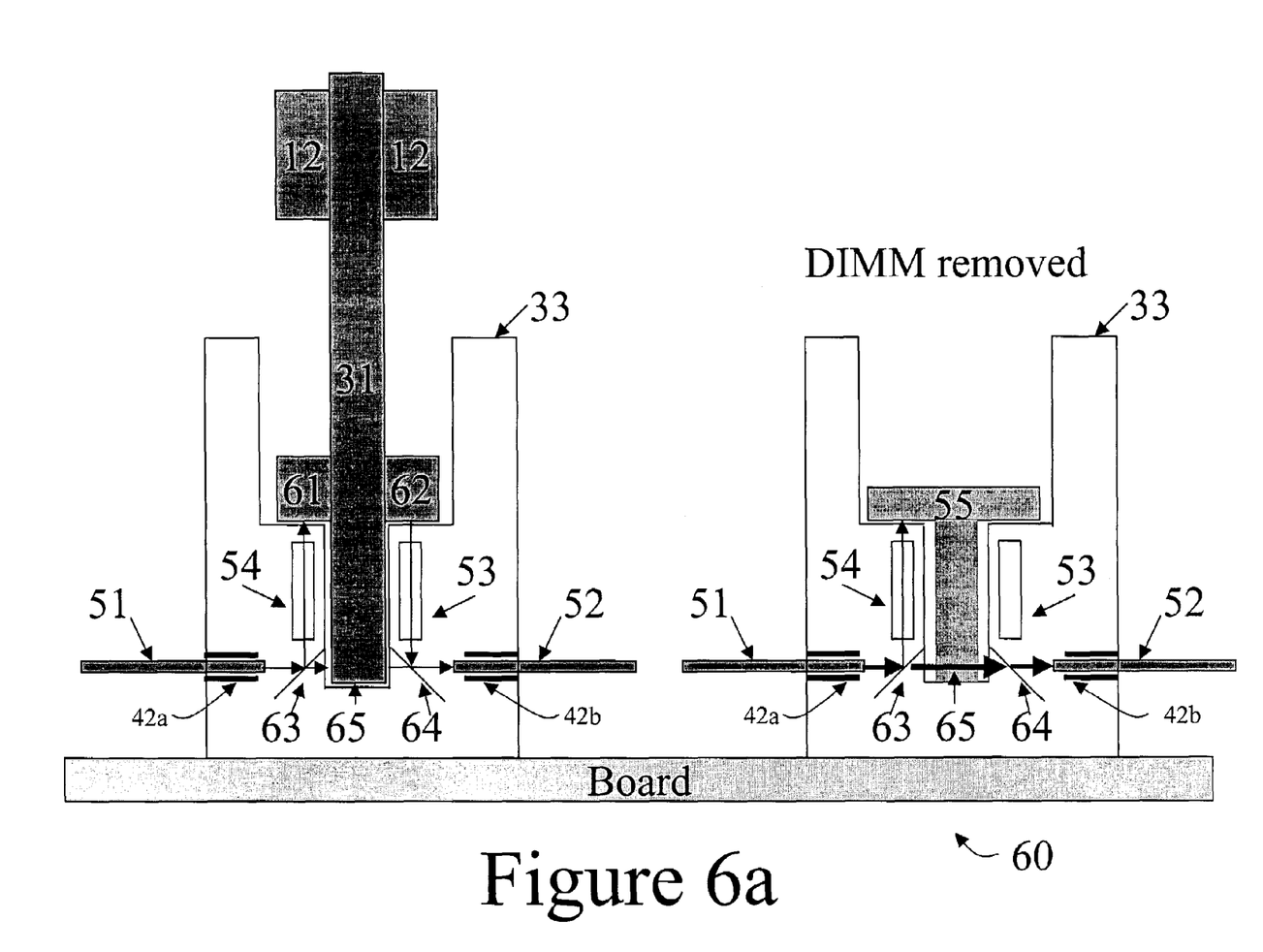
FIGS. 6a and 6b show embodiments of an optical interconnect and housing system, such as may be utilized in embodiments of the system of FIG. 5.

FIG. 6a illustrates details of one embodiment of an optical interconnect and housing system 60, such as may be utilized in embodiments of the system of FIG. 5. The optical connector housing 33 includes a pair of semi-transparent mirrors 63, 64, which are also partially reflective, configured to direct light from an optical fiber link 51 inserted into optical fiber ribbon docking port 42a to an optical transmitter and/or receiver 61, via light pipe or lenses 54. If the optical transmission, for example, a read or write request, is addressed to this DIMM, then the appropriate action reaches the memory devices 12 on the DIMM 31. However, if the optical transmission received by the DIMM 31 is addressed to a different DIMM, device, or other agent, then the optical transmission is re-transmitted by optical transmitter and/or receiver 62 via a light pipe or lenses 53 to a partially reflective mirror 64 to a second optical link 52 inserted into second optical fiber ribbon docking port 42b. In one embodiment, the optical transmitters and/or receivers 61, 62 are part of the optical interface on the DIMM 31, and the optical fiber ribbon docking ports 42a and 42b, mirrors 63 and 64, and light pipe or lenses 53 and 54 form the optical connector 33. A simplified DIMM is shown, illustrating only the memory devices 12 and not the various other components that it may contain.

The right side of FIG. 6a shows one embodiment of the optical connector housing 33 with the DIMM 31 removed. Instead, a dummy DIMM 55 is inserted into the optical connector housing 33. The dummy DIMM 55 does not have an optical transmitter or receiver. It allows optical signals to flow through optical connector housing 33. In this embodiment, the dummy DIMM includes a light pipe 65 that allows an optical signal received from optical link 51 to flow through to optical link 52. An absorption layer in dummy DIMM 55 allows optical signals received from light pipe 54 via semi-transparent mirror 63 to be substantially absorbed within dummy DIMM 55 instead of being reflected.

Figure 6B:
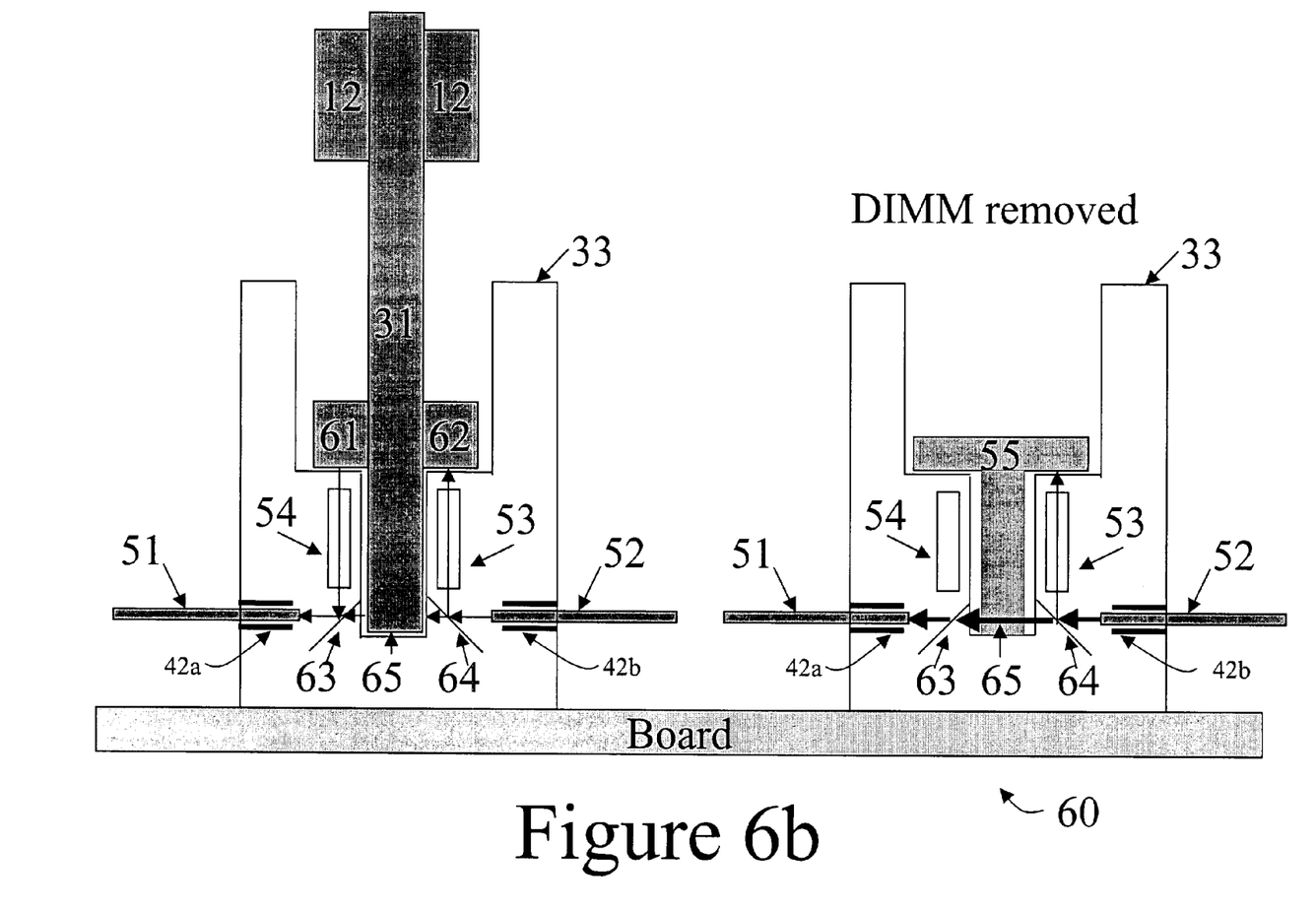

FIG. 6b illustrates details of another embodiment of an optical interconnect and housing system 60 in which optical signals are received from fiber link 52 inserted into optical fiber ribbon docking port 42b. The optical signal is directed by semi-transparent mirror 64 through light pipe or lenses 53 to optical transmitter and/or receiver 62. If the optical transmission, for example, a read or write request, is addressed to this DIMM, then the appropriate action reaches the memory devices 12 on the DIMM 31. However, if the optical transmission received by the DIMM 31 is addressed to a different DIMM, device or other agent, then the optical transmission is retransmitted by optical transmitter and/or receiver 61 via a light pipe or lenses 54 to a partially reflective mirror 63 to a second optical link 52 inserted into second optical fiber ribbon docking port 42a.

The right side of FIG. 6b shows one embodiment of the optical connector housing 33 with the DIMM 31 removed. Instead, a dummy DIMM 55 is inserted into the optical connector housing 33. The dummy DIMM 55 does not have an optical transmitter or receiver. It allows optical signals to flow through optical connector housing 33. In this embodiment, the dummy DIMM includes a light pipe 65 that allows an optical signal received from optical link 52 to flow through to optical link 51. An absorption layer in dummy DIMM 55 allows optical signals received from light pipe 53 via semi-transparent mirror 64 to be substantially absorbed within dummy DIMM 55 instead of being reflected.

In another embodiment the use of a dummy DIMM is not required. Instead, the DIMMs are placed into the system nearest the memory controller first in sequence to the furthest DIMM last. The use of a partially reflective mirror 63, 64 and the use of a dummy DIMM with the light pipe 65 is not required. The mirrors 63 and 64 will be hard mirrors. The system can determine through the low speed signaling the last-placed DIMM and not address any DIMMs past the last-placed DIMM in a system. This simplifies the DIMM connector design and does not require any dummy DIMMs.

In another embodiment, the optical mirror can be optically graded to pick out only one color going to the optical transmitters and/or receivers 61 and 62. This allows each DIMM to be responsive to a different color. The memory controller can talk in parallel to each DIMM at the same time using different colors. The optical graded mirrors can pick out a color for each DIMM and have the rest of the colors pass to the next DIMMs for further segmentation. The optical graded mirror can be inserted into a slot on the DIMM connector thus allowing field upgrade or modification as a memory system is expanded. The optical ribbon cables can be connected in the field by inserting them into optical fiber ribbon docking port 42a and 42b to center the optical path for each connection.

In one embodiment, the optical links 51 and 52 include dual optical fibers, one fiber allows an optical signal to be sent to optical transmitter and/or receiver 61 and 62, respectively, and another fiber allows an optical signal to be received from optical transmitter and/or receiver 61 and 62, respectively. Depending on the optical signal routing, only an optical transmitter or only an optical receiver may be employed for each of the optical transmitter and/or receivers 61 and 62, as will be appreciated by the skilled reader. In another embodiment, the optical link may comprise one optical fiber for both sending and receiving optical signals to and from optical transmitters and/or receivers 61 and 62, for example, when using multiple optical signals having different wavelengths.

Figure 7A:
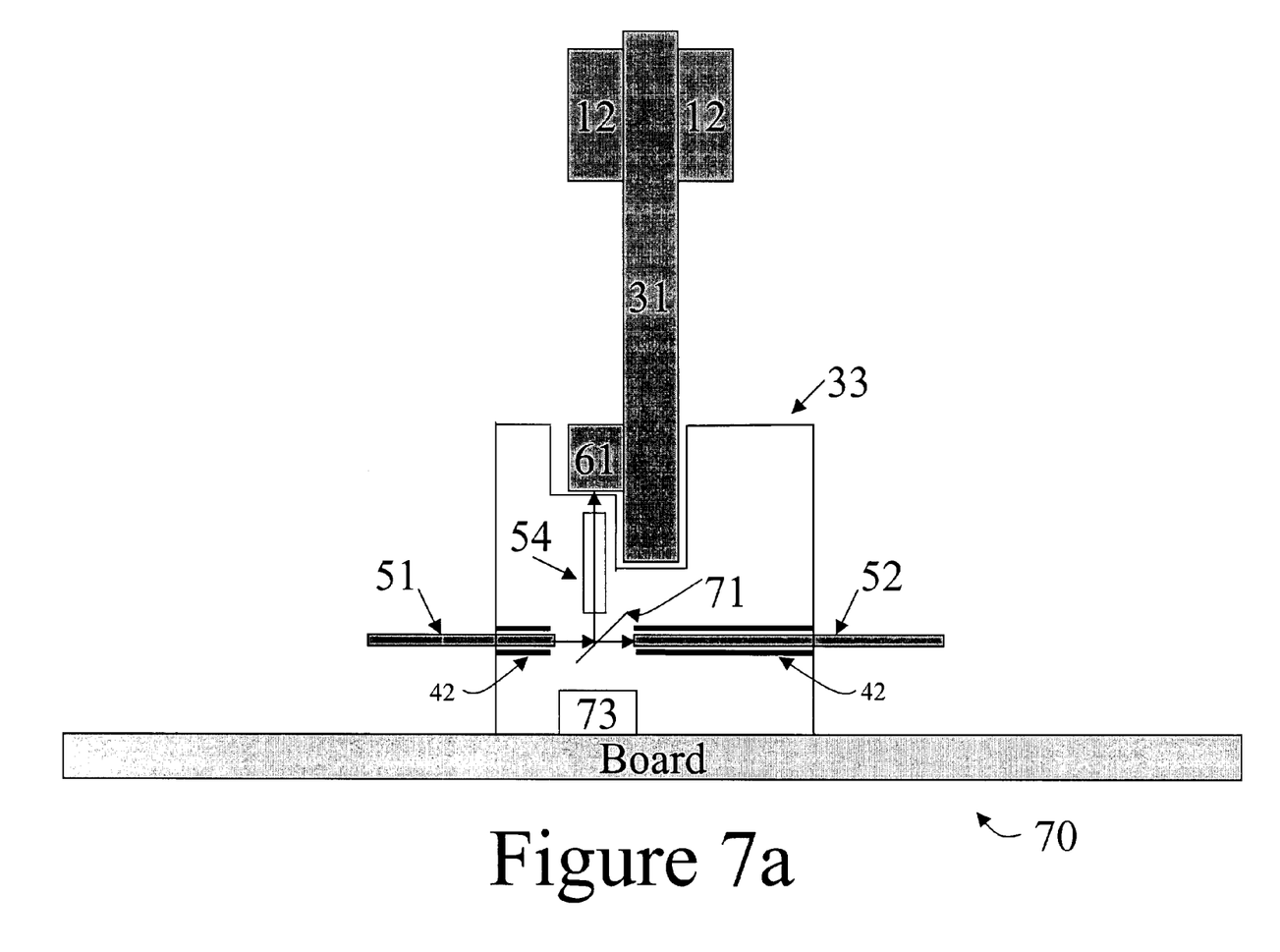
FIGS. 7a and 7b show embodiments of another optical connector and housing system.
Figure 7B:
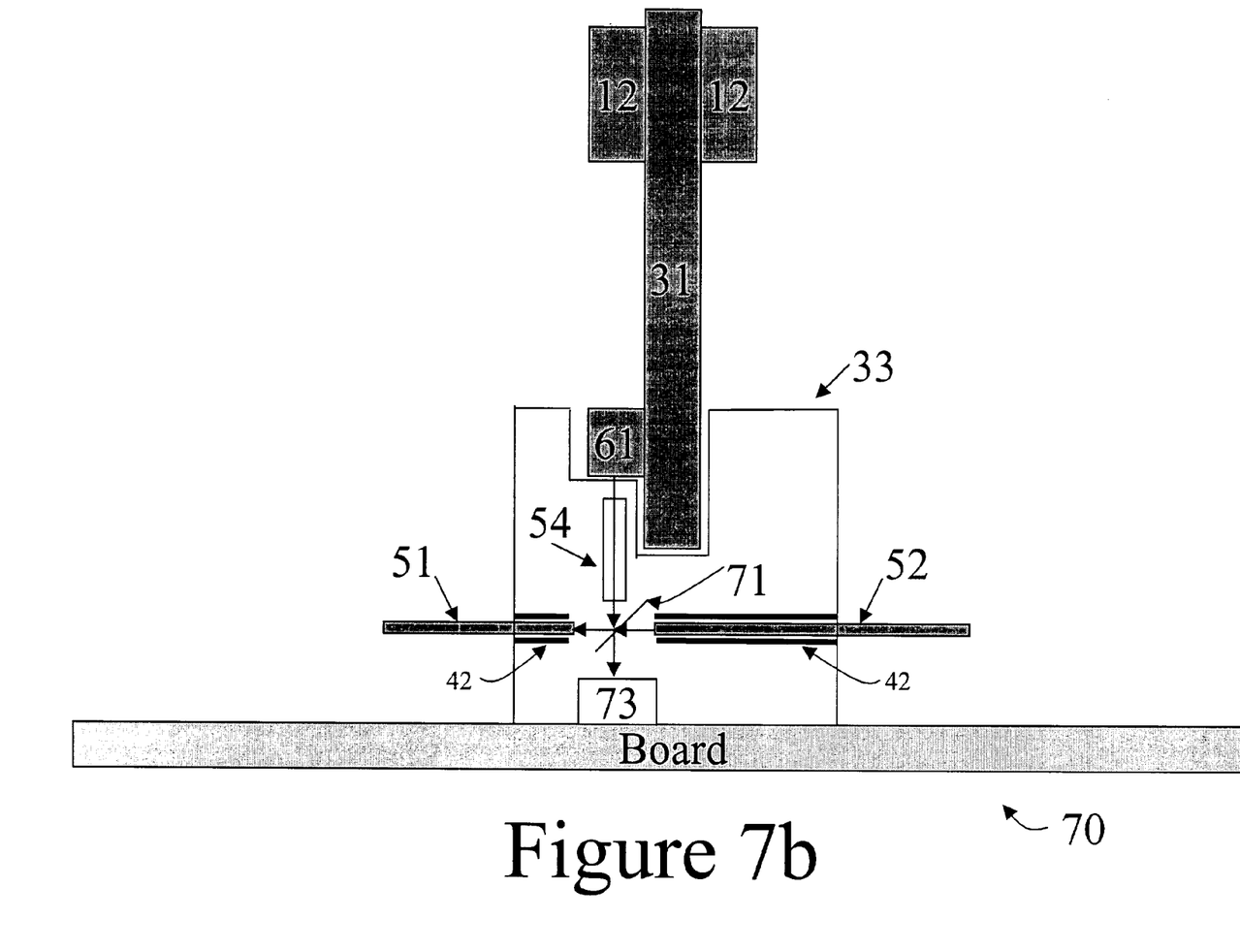

FIGS. 7a and 7b illustrate details of another embodiment of an optical interconnect and housing system 70 which uses an optical bus rather than point-to-point optical links. The system includes separate optical segments 51, 52 of the optical bus that are in optical communication with each other. FIG. 7a shows an optical signal arising from optical segment 51, FIG. 7b shows an optical signal arising from optical segment 52. In one embodiment, this optical connection is maintained by the optical segments 51, 52 being held and aligned in opposing optical fiber ribbon docking ports 42 in the connector housing 33. A semi-transparent mirror 71 is in the optical path between the docking ports 42, enabling the DIMM to be attached to the optical bus without separating the bus into point-to-point segments. An optical transmitter and/or receiver 61 is in an optical path through the light pipe 54 with the semi-transparent mirror, and is mechanically coupled to the substrate 31 of the DIMM. The connector system holds the optical pathway from optical segment 51 to optical segment 52 and to the transmitter and/or receiver in rigid alignment. In some embodiment the upstream returning data also has to be captured or snooped by each DIMM going upstream or downstream to the memory controller. The returning data from optical segment 52 goes to optical segment 51 through the semi-transparent mirror 71. However, a mirror 73 is placed to reflect the data from optical segment 52 back up to the optical transmitter and/or receiver 61.

In one example, write data from optical segment 51 goes to the semi-transparent mirror through light pipe or lenses 54 to optical transmitter and/or receiver 61. It also goes from optical segment 51 through the semi-transparent mirror 71 to optical segment 52. For reads, the data from optical segment 52 goes through the semi-transparent mirror to optical segment 51. It also gets reflected to the flat mirror 73 and through the semi-transparent mirror 71 to light pipe or lenses 54 and to optical transmitter and/or receiver 61. This allows upstream data to be read by down stream DIMMs. In some embodiments, color-selective graded mirrors may be employed, and the data addressed to a specific bus agent can be addressed simply by transmitting it in the appropriate color. In such embodiments, all DIMMs are addressed in parallel thus speeding up access time and decreasing latency time. In some other embodiments, a pellicle can be substituted for the semi-transparent mirror.

Mirrors, semi-transparent mirrors, pellicles, color-selective graded mirrors, and the like may collectively be termed optically reflective devices. The optical ribbon cables can be connected in the field by inserting them into optical fiber ribbon docking port 42 to center the optical path for each connection.

In one embodiment of FIGS. 6a, 6b, 7a and 7b, the optical segments 51 and 52 include dual optical fibers, one fiber allows an optical signal to be sent to optical transmitter and/or receiver 61 and 62, and another fiber allows an optical signal to be received from optical transmitter and/or receiver 61 and 62. Depending on the optical signal routing, only an optical transmitter or only an optical receiver may be employed for each of the optical transmitter and/or receivers 61 and 62, as will be appreciated by the skilled reader. In another embodiment, the optical link may comprise one optical fiber for both sending and receiving optical signals to and from optical transmitters and/or receivers 61 and 62, for example, when using multiple optical signals having different wavelengths.

In one embodiment, the agents of FIGS. 6a, 6b, 7a and 7b, may be arranged in a ring configuration. For example, data may be sent around the ring in only one direction, for example, in a clockwise manner. In another embodiment, the agents may be arranged in a linear manner.

Figure 8:
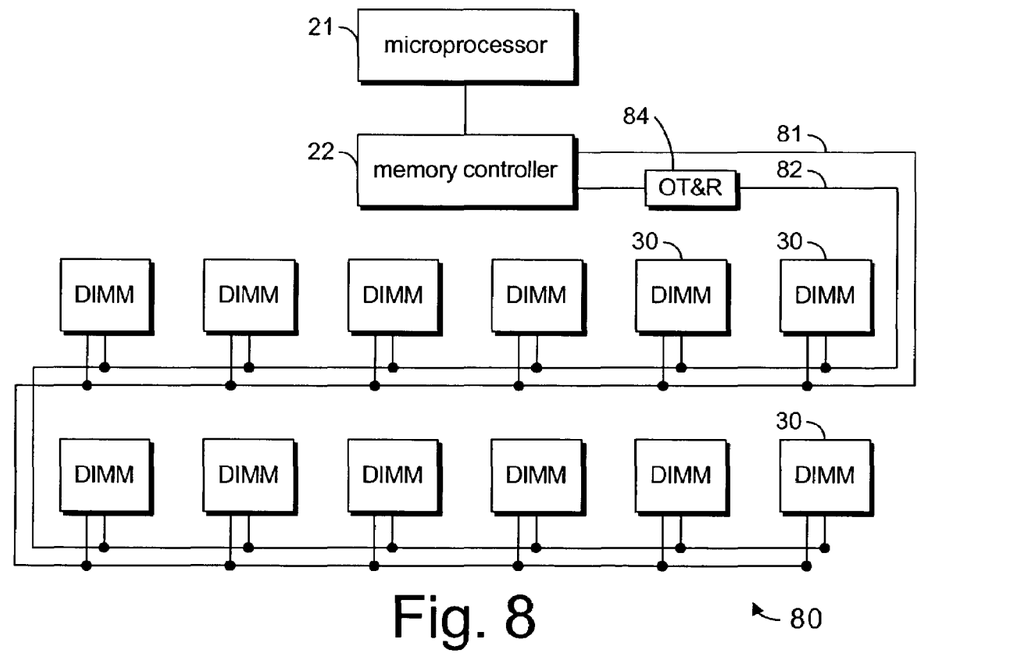
FIG. 8 shows another embodiment of a large memory system having optical and electrical interconnects.

FIG. 8 illustrates one embodiment of a large memory system 80 having optical and electrical interconnects. The system includes a microprocessor 21 and a memory controller 22. The memory controller provides a low-speed communication link 81 and a high-speed communication link 82. In one embodiment, the low-speed link provides power, ground, and supervisory signals, while the high-speed link provides data, address, control, and clock timing signals. In another embodiment, the low-speed link provides address signals, while the high-speed link provides data signals. In another embodiment, the low-speed link provides power, ground, address, and clock signals, while the high-speed link provides data signals. The skilled reader will readily appreciate how to assign various signals to one or the other link, per the requirements of the application at hand.

The system further includes an optical transmitter and receiver ("OT&R") 84 coupling the memory controller's high-speed electrical signals to the optical link 82, and a plurality of DIMMs 30 each coupled to both the high-speed optical link and the low-speed electrical link.

Figure 9:
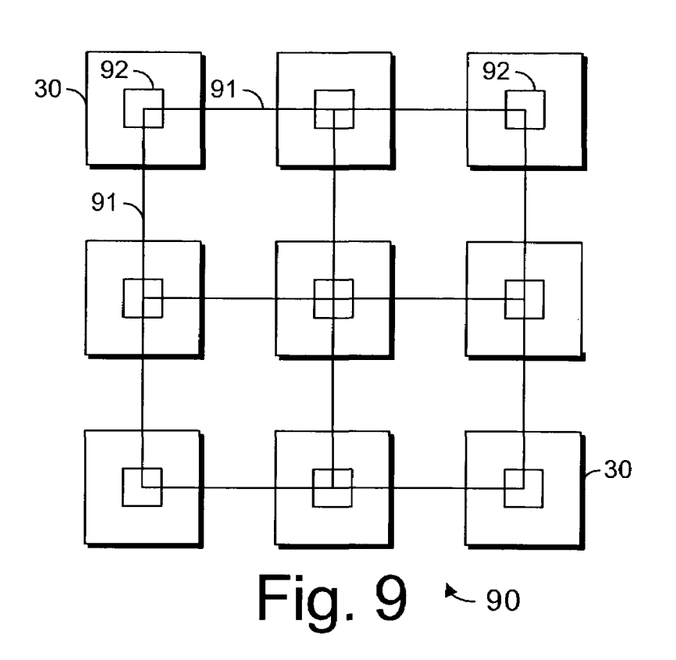
FIG. 9 shows an alternative embodiment of a memory system having optical and electrical interconnects.

FIG. 9 illustrates another embodiment of a memory system 90 having optical and electrical interconnects. For ease of illustration, the low-speed electrical connections are omitted. The memory system includes a plurality of DIMMs 30 interconnected with a high-speed optical mesh or fabric 91 (as opposed to the linear bus configurations shown above) which may be of either the point-to-point or the bus variety. Each DIMM includes an enhanced optical interconnect 92 adapted to provide two or more optical pathways, whereas the example shown in FIGS. 7a and 7b illustrated only a single pathway. These optical pathways may cross, as shown, or they may be parallel or otherwise not cross, in which case the physical routing of the optical fiber will be somewhat different than that shown, as the reader will appreciate.

Figure 10:
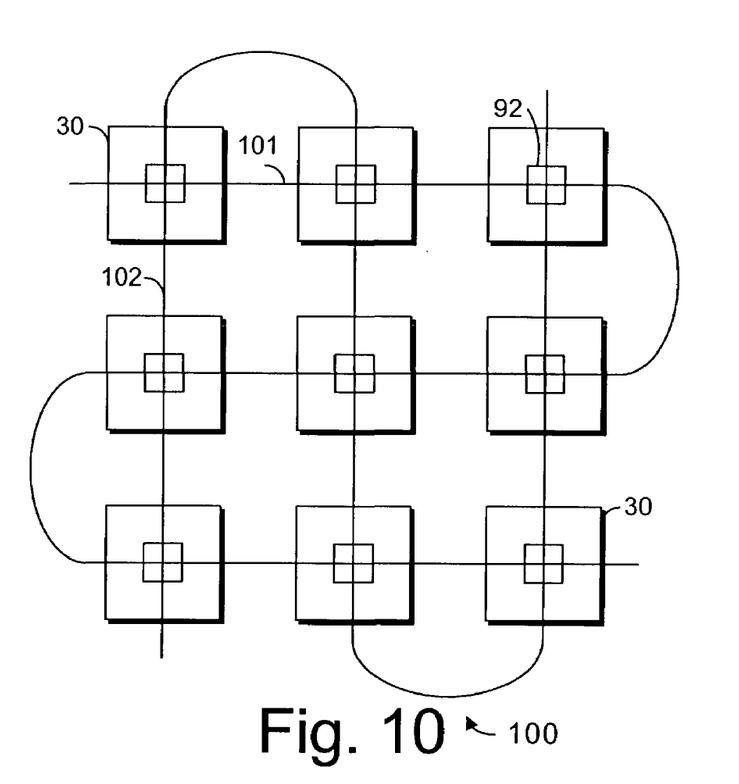
FIG. 10 shows still another alternative embodiment of a memory system having optical and electrical interconnects.

FIG. 10 illustrates yet another embodiment of a memory system 100 using the optical and electrical interconnection system. The memory system includes a plurality of DIMMs 30 interconnected with a first optical bus 101 and a second optical bus 102, each connecting the DIMMs in a different configuration or order. In one embodiment, the DIMMs in this system can use the same type of optical interconnect 92 as in FIG. 9.

Figure 11:
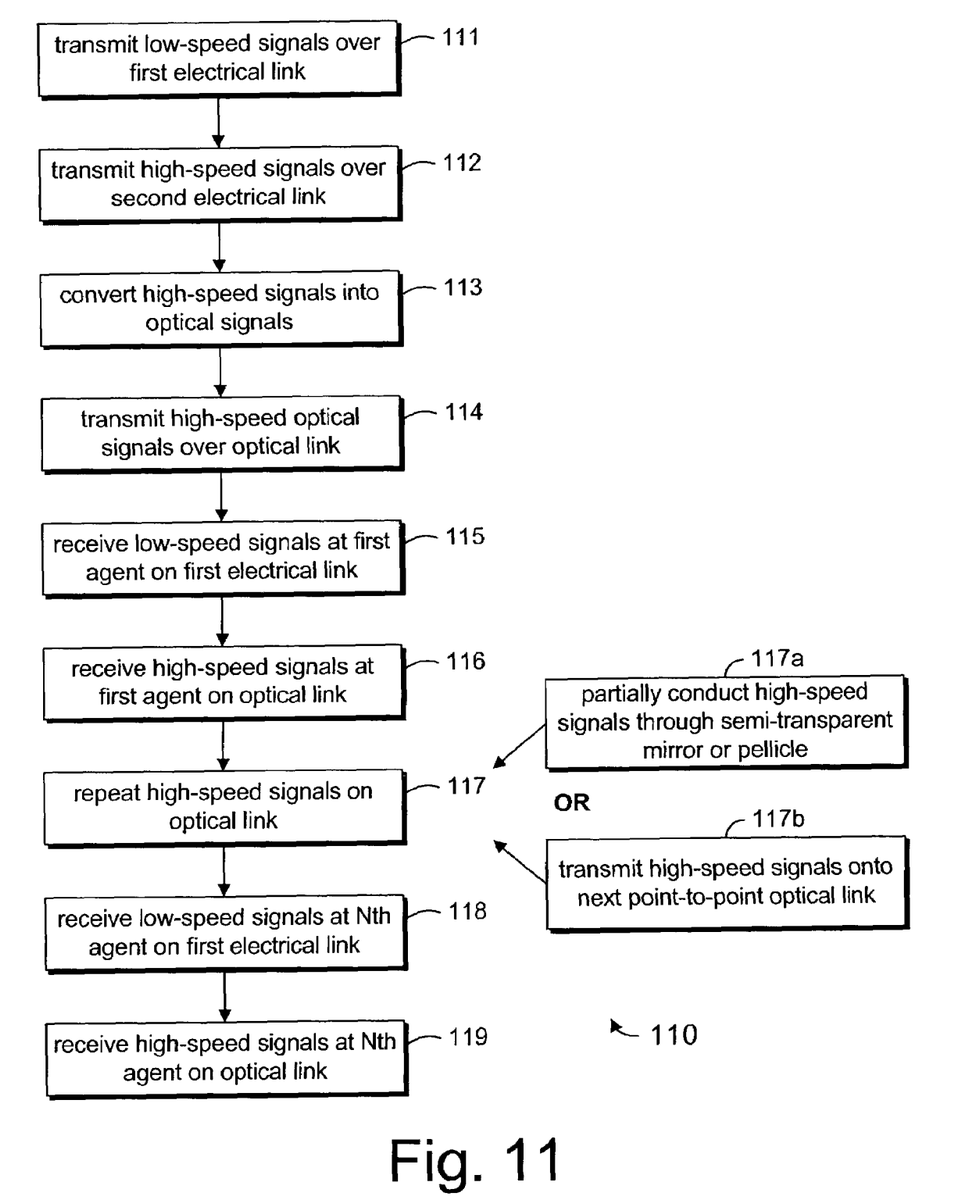
FIG. 11 shows one embodiment of a method of operation of a system employing both optical and electrical interconnects.

FIG. 11 illustrates one exemplary method 110 of operation of a system employing both optical and electrical interconnects. The reader will appreciate that the flowchart is merely for illustration, and does not in all cases imply strict ordering, and that various of the operations may be performed in different orders, or in parallel.

Low-speed signals are transmitted (111) over a first electrical link, such as the power/ground/supervisory busses of a memory controller at power up or initialization. In one example, configuration data is read from an E-Prom on each DIMM. High-speed signals are transmitted (112) over a second electrical link, such as the data/address/clock busses of the memory controller. The high-speed electrical signals are converted (113) into optical signals, such as by an opto-electrical converter or transmitter and receiver. The high-speed optical signals are transmitted (114) over an optical link to set up configuration parameters relating to the configuration data from each DIMMs E-Prom. The low-speed electrical signals of status and setup conditions are received (115) at a first agent, which is coupled to the first electrical link. The high-speed optical signals are received (116) by the first agent, which is also coupled to the optical link. The high-speed optical signals are repeated (117) on the optical link by the first agent to optimize speed and other electrical conditions. In optical bus embodiments, this repeating (117) includes partially conducting (117a) the high-speed optical signals through a semi-transparent mirror or through a pellicle, from one segment of the optical bus to another. In point-to-point embodiments, this repeating (117) includes transmitting (117b) the high-speed optical signals onto a next point-to-point optical link.

The low-speed signals are received (118) at a next agent on the first electrical link and the high-speed optical signals are received (119) at the next agent on the optical link, and so forth, until an Nth or last agent.

The skilled reader will readily appreciate that, while the invention has been described in terms of a memory system in which the agents on the low-speed electrical link and the high-speed optical link are DIMMs, the invention may readily be applied to other technologies like the front side bus of processors or other network busses, and is not limited to use with DIMMs nor to use in memory systems. It may find applicability in any electrical system in which it is desirable or necessary to carry high-speed signals to such a large number of agents, or at such a high speed, or over such great distances, or in such noisy environments, and so forth, that using an electrical link to carry the high-speed signals is impractical, undesirable, or impossible. Other applications in which the invention may prove especially helpful include, but are not limited to, chip-to-chip inter-communication structures, board-to-board inter-communication structures and box-to-box inter-communication structures. The board-to-board and box-to-box inter-communication structures have a potential Ground offset voltage in using electrical signaling, which may damage electrical transceivers. By use of optical signaling there is no Ground offset potential.

The reader should appreciate that drawings showing methods, and the written descriptions thereof, should also be understood to illustrate machine-accessible media having recorded, encoded, or otherwise embodied therein instructions, functions, routines, control codes, firmware, software, or the like, which, when accessed, read, executed, loaded into, or otherwise utilized by a machine, will cause the machine to perform the illustrated methods. Such media may include, by way of illustration only and not limitation: magnetic, optical, magneto-optical, or other storage mechanisms, fixed or removable discs, drives, tapes, semiconductor memories, organic memories, CD-ROM, CD-R, CD-RW, DVD-ROM, DVD-R, DVD-RW, Zip, floppy, cassette, reel-to-reel, or the like. They may alternatively include down-the-wire, broadcast, or other delivery mechanisms such as Internet, local area network, wide area network, wireless, cellular, cable, laser, satellite, microwave, or other suitable carrier means, over which the instructions etc. may be delivered in the form of packets, serial data, parallel data, or other suitable format. The machine may include, by way of illustration only and not limitation: microprocessor, embedded controller, PLA, PAL, FPGA, ASIC, computer, smart card, networking equipment, or any other machine, apparatus, system, or the like which is adapted to perform functionality defined by such instructions or the like. Such drawings, written descriptions, and corresponding claims may variously be understood as representing the instructions etc. taken alone, the instructions etc. as organized in their particular packet/serial/parallel/etc. form, and/or the instructions etc. together with their storage or carrier media. The reader will further appreciate that such instructions etc. may be recorded or carried in compressed, encrypted, or otherwise encoded format without departing from the scope of this patent, even if the instructions etc. must be decrypted, decompressed, compiled, interpreted, or otherwise manipulated prior to their execution or other utilization by the machine.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that any other variations from the foregoing description and drawings may be made within the scope of the present invention. Indeed, the invention is not limited to the details described above. Rather, it is the following claims including any amendments thereto that define the scope of the invention.

What is claimed is:

1. An apparatus comprising:
   an optical bus;
   at least three agents coupled in series to the optical bus, wherein at least one of the agents comprises:
   a connector housing optically coupled to the optical bus;
   an optical interface optically connected to the connector housing;
   an optical-to-electrical signal converter optically connected to the optical interface; and
   an electrical device electrically connected to the optical-to-electrical signal converter, wherein the electrical device comprises an addressable memory,
   wherein the connector housing comprises two mirrors and the at least one of the agents comprises an optical transmitter and an optical receiver in optical connection with respective ones of the two mirrors, wherein the optical transmitter to retransmit an optical signal onto the optical bus if the optical signal is not addressed to the addressable memory.

2. The apparatus of claim 1 wherein the agents are arranged in a ring configuration.

3. The apparatus of claim 2 wherein data is only transmitted in one direction around the ring configuration.

4. A system comprising:
   a device having,
   a low-speed electrical interface for providing low-speed electrical signals, and
   a high-speed electrical interface for providing high-speed electrical signals;
   an electrical-to-optical signal converter electrically coupled to the high-speed electrical interface;
   an electrical bus coupled to the low-speed electrical interface;
   an optical bus coupled to the electrical-to-optical signal converter; and
   a plurality of agents each coupled to the electrical bus and in series to the optical bus, wherein each agent further comprises a uniquely color-selective mirror in an optical path of the optical bus,
   wherein device comprises a memory controller and the plurality of agents comprises a plurality of memory modules, and wherein the memory controller can talk in parallel with a plurality of memory modules at a same time using different color light.

5. The system of claim 4 wherein the plurality of memory modules comprises a plurality of DIMMs.

6. The system of claim 4 wherein:
the optical bus comprises an optical fiber ribbon cable; and
each agent comprises an optical fiber ribbon docking port coupled to the optical bus.

7. The system of claim 6 wherein:
each agent further comprises a semi-transparent mirror in an optical path of the optical fiber ribbon docking port.

8. The system of claim 6 wherein:
each agent further comprises a pellicle in an optical path of the optical fiber ribbon docking port.

9. The system of claim 4 wherein the optical bus is configured as one of a mesh, a fabric, and a linear bus.

* * * * *